United States Patent [19]
Loichen

[11] 3,771,698
[45] Nov. 13, 1973

[54] INJECTION MOLDING MACHINE

[75] Inventor: Erwin Loichen, Gallenbach, Germany

[73] Assignee: Zargun Fabrik fur Spezialkunstsoffmaschinen GmbH, Aichach, Germany

[22] Filed: Nov. 24, 1971

[21] Appl. No.: 201,703

[30] Foreign Application Priority Data
Sept. 10, 1971  Germany................... P 21 45 364.5

[52] U.S. Cl................... 222/413, 222/548, 251/45, 251/191, 425/245
[51] Int. Cl............................................. G01f 11/22
[58] Field of Search............... 222/236, 413, 548; 78/30 RU; 425/244, 245; 259/25, 26, 45, 46, 191; 251/304, 309

[56] References Cited
UNITED STATES PATENTS

| 3,169,275 | 2/1965 | Compton et al. | 425/245 X |
| 192,622 | 7/1877 | Guild et al. | 251/304 |
| 3,593,375 | 7/1971 | Hendry | 259/191 |
| 3,317,962 | 5/1967 | Morse | 259/191 |
| 3,092,365 | 6/1963 | Knappe | 251/309 |
| 3,271,819 | 9/1966 | Lacher | 259/191 |
| 3,500,501 | 3/1970 | Johnasson | 425/245 |

FOREIGN PATENTS OR APPLICATIONS

| 712,182 | 7/1940 | Germany | 425/244 |

*Primary Examiner*—Samuel F. Coleman
*Assistant Examiner*—Larry Martin
*Attorney*—Kurt Kelman et al.

[57] ABSTRACT

The extrusion head of an injection molding machine having a cylinder and a screw axially secured in the cylinder is equipped with a closure that includes a valve pin rotatable about an axis perpendicular to the cylinder axis and formed with an external notch which connects the cylinder cavity with the extrusion nozzle in the open position, and is open toward the cylinder interior in the closed position so that the resin composition cannot congeal in the valve between successive molding operations.

15 Claims, 5 Drawing Figures

3,771,698

INJECTION MOLDING MACHINE

This invention relates to the injection molding of plastics, and particularly to an improved injection molding machine having an extrusion cylinder and a screw coaxially rotated in the cylinder in an axially fixed position, the extrusion head of the machine being equipped with a closure for interrupting the flow of extruded material from the cylinder cavity to the extrusion nozzle while the screw is continuously rotated.

In known injection molding machines of the type referred to, a very high pressure is built up in the axially terminal portion of the cylinder adjacent the extrusion head when the flow of material from the cylinder to the nozzle is interrupted by the closure, and the plastic material may cool in and near the closure and be injected into an associated mold in the cooled condition during the next injection cycle, thereby causing defects in the molded product.

In order to control the pressure generated near the extrusion head while the closure interrupts discharge of the plastic material, the rotary speed of the screw must be varied according to the nature of the plastic worked, and conventional injection molding machines of the described type must be equipped with a drive arrangement permitting a wide variation in screw speed when various plastics are to be molded. Because of the large energy input required by such machines, the variable speed drives materially contribute to the cost of the known machines.

A primary object of this invention is the provision of an injection molding machine of the afore-described type which permits various plastics to be molded at approximately uniform screw speeds without exceeding a permissible maximum pressure in the cylinder cavity near the extrusion head, and without causing defects in the molded articles due to the intermittent discharge of the resin composition.

According to this invention, a face of the axially terminal cylinder portion near the extrusion head which is axially opposite the extruder screw is formed with a recess which conically flares toward the screw at an apex angle smaller than the apex angle at which the axial end portion of the screw tapers conically toward the recess. The compression space between the two conically sloping surfaces is connected with the elongated conduit through which synthetic resin composition is discharged from the cylinder cavity when the screw rotates, the inner end portion of the conduit communicating directly with the afore-mentioned recess at the apex of the corresponding cone, and the outer end portion of the conduit being located in the nozzle of the extrusion head.

A closure is provided in a portion of the conduit intermediate the inner and outer end portions and includes a pin member elongated transversely of the conduit and rotatable about a longitudinal axis through an angle of about 90° between a conduit opening and a conduit closing position. A notch in an outer wall of the pin member is open in a direction away from the longitudinal axis of the pin member and connects the two end portions of the conduit in the conduit-opening angular position of the pin member. In the conduit-closing position of the pin member, the notch is open toward the inner end portion of the conduit while being sealed from the outer end portion.

Other features, additional objects, and many of the attendant advantages of this invention will readily be appreciated as the invention becomes better understood from the following detailed description of a preferred embodiment when considered in connection with the appended drawing in which.

Figure 1:
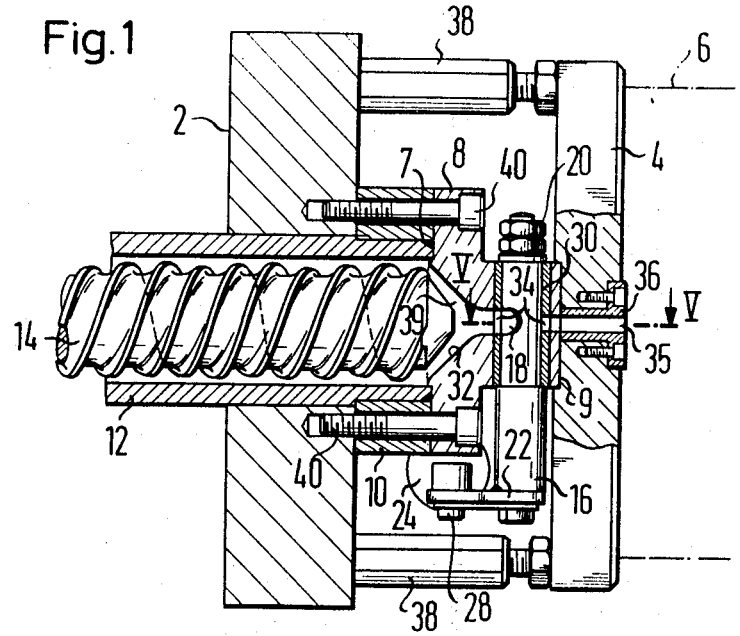
FIG.1 is a fragmentary elevational view of an injection molding machine of the invention taken in section on the line I—I of FIG.2.
Figure 2:
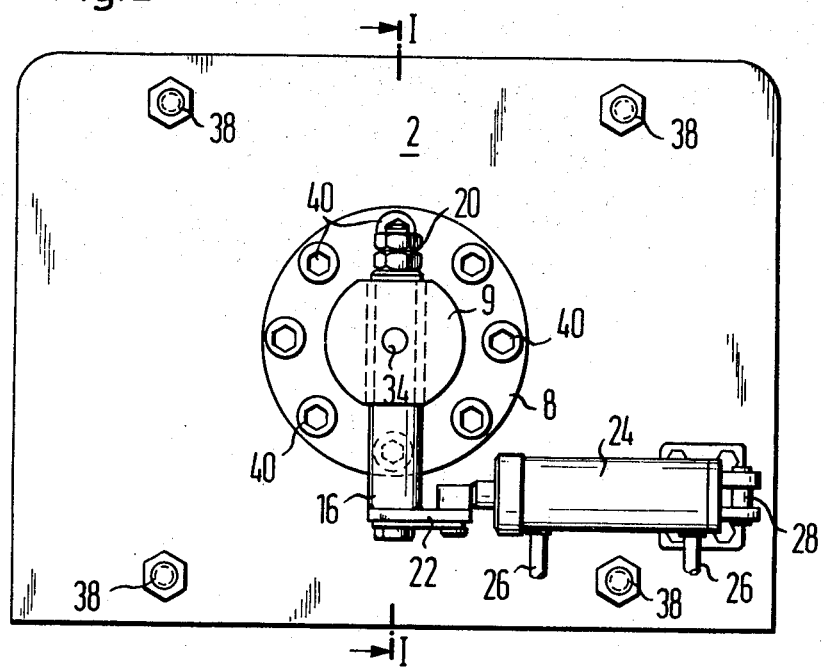
FIG.2 is a front elevation of the apparatus of FIG.1 without its nozzle assembly.

Referring now to the drawing in detail, and initially to FIGS.1 and 2, there is shown only as much of an injection molding machine of the invention as is needed for an understanding of the invention, the omitted portions of the machine being conventional.

The extrusion head of the machine is mounted on a heavy upright support plate 2 connected with a front plate 4 by four columns 38 of adjustable length. The front plate 4 is a part of the nozzle assembly as will presently become apparent, and engages a mold 6 during normal operation of the machine, the mold being shown in phantom outline only.

The cylinder 12 of an extruder passes horizontally through an opening in the support plate 2. Only the front end of the cylinder 12 is seen in FIG.1 and is attached to a radial end wall 8 by welds 7. Eight screws 40, equiangularly distributed about the cylinder axis attach the end wall 8 and a spacer ring 10 interposed between the end wall and the support plate 2 to the latter. A screw 14 is coaxially mounted in the cylinder 12.

Figure 5:
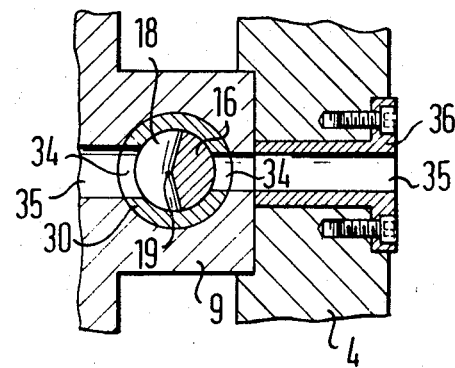
FIG.5 shows a portion of the apparatus of FIG.1 in section on the line V—V.

The central portion 9 of the end wall 8 projects into abutting engagement with the front plate 4 and is formed with a bore therethrough whose axis intersects the common axis of the cylinder 12 and screw 14 of the extruder at right angles. The bore is lined with a sleeve 30, and the latter rotatably receives a cylindrical valve pin 16. A notch 18 in an outer cylindrical wall of the pin 16 is best seen in FIG.5 which shows the angular ridge 19 in the face of the pin 16 forming the bottom of the notch 18. The ridge 19 is elongated in the direction of pin elongation. The pin 16 is axially secured in the bore of the end wall portion 9 partly by nuts 20 on its upper end. The lower end of the valve pin 16 is connected by a link 22 to the piston rod of a double-acting hydraulic motor 24 supplied with pressure fluid or drained of the fluid through flexible lines 26 near its two ends respectively, and attached to the support plate 2 by a hinge 28. The motor 24 and link 22 are dimensioned and arranged for turning the valve pin 16 back and forth through an angle of 90°.

Figure 3:
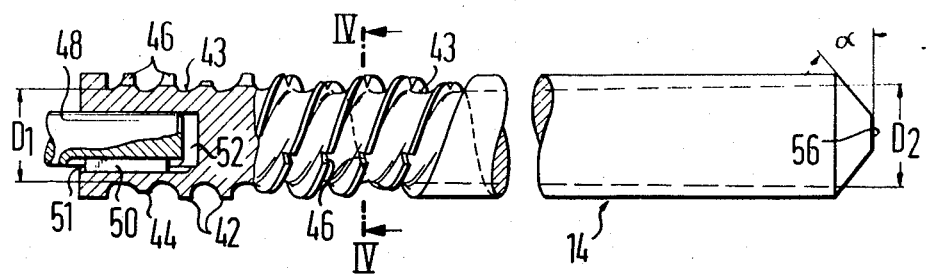
FIG.3 shows the extruder screw of the same machine in side elevation and partly in axial section.
Figure 4:
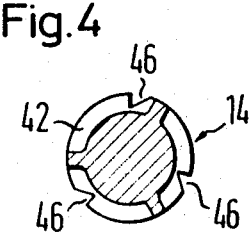
FIG.4 illustrates the screw of FIG.3 in section on the line IV—IV.

The front wall 8 of the cylinder 12 has a recess 32 which flares conically toward the front end of the screw 14. As is best seen in FIG.3, the latter is of frustoconical overall shape. Its conical face tapers at an angle α of 40° toward the smaller base 56 of the frustum so that the apex angle of the screw end is 100°, and is greater than the apex angle of the conical wall in the recess 32. The frustoconical front end of the screw 14 and the conical wall of the recess 32 axially bound a compression chamber 39 which is connected to a nozzle 36 in the front plate 4 by a discharge conduit 35 coaxial with the cylinder 12, the outer end portion of the conduit extending in the nozzle 36, and the inner end extending axially outward from the cylinder cavity from the apex of the cone defined by the wall of the recess 32.

The outer and inner end portions of the conduit 35 may be connected by the notch 18 which forms an intermediate portion of the conduit in the conduit opening position of the valve pin 16 not illustrated in the drawing. The plastic fed forward by the rotating screw sequentially passes from the compression chamber 39 through the inner end portion of the conduit 35, one of two diametrically opposite radial bores 34 of the sleeve 30 which are of different size, the notch 18, the other, smaller bore 34, the outer end portion of the conduit 35, and out of the nozzle 36 into the mold 6. In the illustrated conduit-closing position of the valve pin 16, the notch 18 is open toward the inner end portion of the conduit 35, but is sealed from the outer end portion by the body of the pin 16.

As is better seen in FIG.3, the screw 14 has three threads 42, 42, 44 which are of equal and uniform lead angle so that they are parallel. The two threads 42 are of equal diameter and their crests or ridges determine the outer diameter of the screw 14. The diameter of the thread 44 is somewhat smaller although the difference is not as great as has been shown in FIG.3 for the purpose of recognizable pictorial representation. The output shaft 48 of a drive unit, not otherwise shown, is secured to the screw 14 by a key 50 and keyways 51 in the shaft 48 of the screw 14 in a bore 52 of the screw which is open in a rearward axial direction. The shaft 48 prevents rearward axial movement of the screw 14 under the pressure of the pastic material in the extruder, and thereby axially secures the screw in the cylinder 12. The several threads 42, 42, 44 are provided with saw-tooth shaped notches 46 in their ridges at the rear end of the screw 14 where plastic material in the form of granules or larger pieces is fed to the cylinder 12 from a bin for plastication by the screw 14 in a conventional manner, not illustrated. The drawing also does not show the electric heaters which maintain a desired temperature in the extruder, and other devices commonly employed in this art and not directly relevant to this invention though necessary for practical operation of the illustrated molding machine.

The helical grooves 43 bounded by the flanks of the threads 42, 42, 44 are arcuate in section through the screw axis, and the radius of curvature of the bottom portion of the flank nearer the front end of the cylinder 12 is greater than the radius of curvature of the corresponding flank portion more remote from the front wall 8. Each groove 43 decreases in its depth from the rear end of the screw 14 near the shaft 48 to the front wall 8. The depth of the groove at the front end is close to three-fourths of the depth at the rear end, as is best seen by comparing FIGS.1 and 3.

Other dimensional relationships, not capable of realistic representation in the drawing, are important for optimum performance of the injection molding machine. Thus, the actual difference between the outer diameter of the thread 44 and the outer diameter of the screw 14 as determined by the outer diameter of the threads 42 should be 0.279 to 0.282 percent of the outer screw diameter, and the lead or pitch of each thread should be two-thirds of the outer screw diameter.

The depth of the groove portion 43 most remote from the end wall 8 should not be significantly different from 1.15 percent of the axial length of the threaded screw portion, and the depth of the groove portion nearest the end wall 8 should be 0.87 percent of the axial length of the threads.

The two terminal parts of the conduit 35 are not of equal cross section. The inner end portion has a cross sectional area practically identical with the area of the smaller base 56 of the conical frustum constituted by the forward end portion of the screw. The outer end portion is of smaller cross section, and the bores 34 respectively adjacent the conduit portion differ similarly from each other. The solid body or core of the screw 14 at its front end has a diameter $D_2$ which is greater than the corresponding diameter $D_1$ of the rearmost screw portion because of the variation in depth of the grooves 43. The pitch or lead of the threads 42, 44 is uniform over the entire screw length.

The height of the notch 18 as measured in the direction of elongation of the pin 16, is equal to the diameter of the cylindrical, inner end portion of the conduit 35, and the ridge 19 reduces the flow section of the notch 18 to that of the narrower outer end portion of the conduit 35 in the conduit opening position, not shown, of the pin 16.

It has been found that the pressure of the synthetic resin composition in the compression chamber 39 is most favorably distributed over the walls bounding the chamber in the closed position of the pin 16 when the angle $\alpha$ is 40°, and when the apex angle of the conical wall of the recess 32 is smaller than the corresponding angle of the front end of the screw 14. A charge of molten resin composition is kept in readiness in the compression chamber 39 which, in the conduit closing position of the pin 16, includes the notch 18 and the inner end portion of the conduit 35. The chamber is rearwardly bounded by the screw 14 and the plastic material urged toward the chamber by the continuously rotating screw 14. There is sufficient convection in the viscous mass in the compression chamber to maintain a practically uniform temperature in the mass while the valve pin 16 is in the illustrated position. The ridge 19 favors convection even in the notch 18.

The operation of the machine needs to be modified only to a minor extent when different resin compositions are employed, and it has been found that such adjustments can be made by varying the periods in which the pin 16 is in the conduit closing position while keeping the rotary speed of the screw 14 constant. It has been found practical to install a pressure sensor in the compression chamber 39, and to operate the hydraulic motor 24 in response to a peak pressure in the chamber 39, thereby starting the molding cycle automatically. The valve pin 16 may be shifted into the closing position in a similar automatic manner by a pressure sensor monitoring the pressure exerted by the injected resin composition on the mold 6.

At least two threads on the screw 14 are preferred, and three threads, as shown, have been found superior even to two. Plasticated resin composition is discharged into the compression chamber 39 from three discharge orifices of the grooves 43 which are offset equiangularly about the screw axis and uniformly charge the chamber 39.

The several parallel threads 42, 42, 44 make the grooves 43 narrower than would be the case with two threads or one thread. The grooves, however, may be made much deeper than is usual in machines of this type. The known screws relied for contact of the fed material both with the inner cylinder wall and the screw for uniform plastication. It has been found that the deeper grooves of the invention reduce the frictional effect of the inner cylinder wall on the resin composition, and the plastication of the resin is achieved mainly by the action of the screw threads whose area in contact with the material being fed is greater than that of the cylinder wall. The deep grooves 43 accommodate relatively large particles of resin composition so that molding scrap, gates, sprues, and the like, may be directly fed to the cylinder 12. Such scrap is mechanically comminuted by engagement with the notches 46 in the threads before it is heated to its softening temperature. The area of smaller radius of curvature at the groove bottom has been found to contribute to uniform and rapid forward feeding of the resin material while the areas of larger radius of curvature in the grooves favor intimate mixing of the transported material.

The lower threads 44 define a helical path through which plastic material may flow backward from the compression chamber 39 when the pressure in the latter reaches a high value behind the closed valve pin 16. The safety by-pass thus provided permits the screw 14 to be rotated continuously at relatively high speed so that the mold 6 may be charged quickly when the valve pin is turned to its conduit opening position. The axial circulation of the material in the cylinder 12 also contributes to uniform temperature. The rate of circulation is a function of viscosity and is adjusted automatically to maintain a constant viscosity under a given set of other conditions. This factor also is believed important to the observed feature of the apparatus that it is capable of processing widely varying materials at uniform rotary speeds of the screw 14.

The various dimensional relationships outlined above have been found experimentally to be conducive to most efficient operation of the machine under a wide variety of processing variables including the resin composition handled and the nature of the molded objects. In an actual injection molding machine of the invention, the screw 14 has a total length of 1,095 mm, an outer diameter of 106.4 to 107.5 mm, a pitch of 75.8mm, and its grooves 43 vary in depth between 12 and 9 mm. The radii of curvature at the groove bottom are 5 and 10 mm respectively, and one of the three threads is lower than the two others by 0.3 mm.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In an injection molding machine including a cylinder, having an axis, a screw axially secured in said cylinder, drive means for rotating said screw about said axis, and nozzle means on one end portion of said cylinder defining an elongated conduit for discharging a synthetic resin composition from said cylinder when said screw is rotated, the improvement which comprises:

a. said nozzle means being that of a front plate and end wall attached to said end portion, said end wall at one face being formed with a recess conically flaring toward said screw,
  1. said screw having an axial end portion conically tapering toward said recess,
  2. the apex angle of the cone defined by said recess being smaller than the apex angle of the cone defined by said end portion of the screw,
  3. said conduit having an inner end portion directly communicating with said recess at the apex of the cone defined by the recess, and an outer end portion spaced outward of said cylinder from said inner end portion in the direction of said axis; and
b. closure means in a portion of said conduit intermediate said inner and outer end portions thereof,
  1. said closure means including a pin member elongated transversely of said conduit and rotatable about a longitudinal axis between a conduit opening and a conduit closing position,
  2. said pin member being formed with a notch in an outer wall thereof open in a direction away from said longitudinal axis,
  3. said notch connecting said inner and outer end portions in the conduit opening position of said pin member, and being open toward said inner end portion while sealed from said outer end portion in the conduit closing position of the pin member.

2. In a machine as set forth in claim 1, said closure means further including a sleeve member formed with respective apertures directly communicating with said inner and outer end portions, said pin member being received in said sleeve member for angular movement of 90° between said positions.

3. In a machine as set forth in claim 1, said screw having a plurality of parallel threads.

4. In a machine as set forth in claim 3, axially successive respective turns of said plurality of threads defining therebetween a groove of arcuate cross section, respective flanks of said turns bounding said groove and having bottom portions of different radius of curvature in said cross section, the radius of curvature of the flank nearer said one axially terminal portion of the cylinder being greater.

5. In a machine as set forth in claim 3, one of said threads having a smaller outer diameter than the other thread.

6. In a machine as set forth in claim 5, the outer diameter of said one thread being smaller than the outer diameter of said other thread by 0.279 to 0.282 percent of said outer thread diameter.

7. In a machine as set forth in claim 3, the lead of each of said threads being substantially two-thirds of the outer diameter of said screw.

8. In a machine as set forth in claim 1, the threads of said screw defining a helical groove about said axis, the depth of said groove decreasing in a direction toward said one axially terminal portion of the cylinder.

9. In a machine as set forth in claim 8, the portion of said groove nearest said one axially terminal portion having a depth substantially three-fourths of the depth of the portion of said groove most remote from said one axially terminal portion.

10. In a machine as set forth in claim 9, the depth of said most remote portion being 1.15 percent of the axial length of said threads, and the depth of said nearest portion being 0.87% of said axial length, said threads being of uniform pitch.

11. In a machine as set forth in claim 1, the apex angle of the cone defined by said axial end portion of the screw being 100°.

12. In a machine as set forth in claim 11, said axial end portion of the screw having a frustoconical shape.

13. In a machine as set forth in claim 12, said frustoconical end portion having a smaller base surface of an area equal to the cross sectional area of the inner end portion of said conduit.

14. In a machine as set forth in claim 1, said conduit having an axis intersecting said longitudinal axis, and motor means drivingly connected to said pin member for rotating the same between said positions thereof through an angle of substantially 90°.

15. In a machine as set forth in claim 14, said pin member having a face in said notch, said face having an angular ridge elongated in the direction of elongation of said pin member.

* * * * *